(12) United States Patent
Tai

(10) Patent No.: US 6,904,384 B2
(45) Date of Patent: Jun. 7, 2005

(54) COMPLEX MULTIVARIATE ANALYSIS SYSTEM AND METHOD

(75) Inventor: Hung-En Tai, Taipei Hsien (TW)

(73) Assignee: Powerchip Semiconductor Corp., Hsin-Chu (TW)

( * ) Notice: Subject to any disclaimer, the term of this patent is extended or adjusted under 35 U.S.C. 154(b) by 71 days.

(21) Appl. No.: 10/249,375

(22) Filed: Apr. 3, 2003

(65) Prior Publication Data

US 2004/0199358 A1 Oct. 7, 2004

(51) Int. Cl.⁷ .............................................. G06F 15/46
(52) U.S. Cl. ........................ 702/179; 702/22; 702/30; 702/31; 702/32; 700/109; 700/110; 700/121
(58) Field of Search .............................. 702/22, 30, 31, 702/32, 179, 193; 700/109, 110, 121; 438/5, 8–12, 14, 18, 690, 706; 216/59; 118/712

(56) References Cited

U.S. PATENT DOCUMENTS

| | | | | |
|---|---|---|---|---|
| 5,479,340 A | * | 12/1995 | Fox et al. ...................... | 700/33 |
| 5,862,054 A | * | 1/1999 | Li ............................... | 700/121 |
| 5,864,773 A | * | 1/1999 | Barna et al. ................... | 702/85 |
| 5,903,890 A | | 5/1999 | Shoji et al. | |
| 6,153,115 A | * | 11/2000 | Le et al. ....................... | 216/60 |
| 6,368,975 B1 | * | 4/2002 | Balasubramhanya et al. .... | 438/706 |
| 6,413,867 B1 | * | 7/2002 | Sarfaty et al. ............... | 438/689 |
| 6,521,080 B2 | * | 2/2003 | Balasubramhanya et al. .... | 156/345.24 |
| 6,589,869 B2 | * | 7/2003 | Sarfaty et al. ............... | 438/689 |
| 2004/0049898 A1 | * | 3/2004 | Imai et al. .................. | 29/25.01 |

* cited by examiner

Primary Examiner—Carol S. W. Tsai
(74) Attorney, Agent, or Firm—Winston Hsu

(57) ABSTRACT

A complex multivariate analysis system is provided. The system has a storage module, a selecting module, an analyzing module, a correlation searching module and a reporting module. The storage module includes a first database and a second database. The first database records at least two data sets, each of the data sets including a plurality of items associated with a manufacturing process and data of the items. The second database records correlations of the items between the two data sets. The selecting module selects a first item from a first data set. The analyzing module analyzes the first item selected by the selecting module and determines whether the data of the first item conform to specifications or not. The correlation searching module searches the second database when the analyzing module determines that the data of the first item do not conform to the specifications, and selects a second item correlated to the first item from a second data set. Following that, the analyzing module analyzes the second item and determines whether the data of the second item conform to specifications or not.

16 Claims, 2 Drawing Sheets

COMPLEX MULTIVARIATE ANALYSIS SYSTEM AND METHOD

BACKGROUND OF INVENTION

1. Field of the Invention

The present invention relates to a complex multivariate analysis system and a method for analyzing the same, and more particularly, to a complex multivariate analysis system for analyzing process parameters and testing results of products.

2. Description of the Prior Art

Many products are produced using a plurality of processes. For example, semiconductor devices are produced using repeatedly lithographic processes, etching processes and ion implantation processes. A great amount of equipment for these processes is therefore required for manufacturing the devices. In this case, manufacturers have to make a lot of efforts to maintain the equipment in normal to improve throughputs and qualities of the products.

With progress of the semiconductor techniques, however, the processes and data for forming the products are more and more complicated. It is difficult to track and discover the process issues from the complicated data. Computers and statistical methods are now used to facilitate tracking and discovery of the process issues. Being featured by critical processes, huge amounts of data, and complicated equipment modules, it is difficult for those skilled in the art to analyze and characterize the process parameters even using computers and data mining methods. A suitable mechanism is still under research for sifting useful information from the complicated data. More professional analysts and costs are therefore necessary to do analysis of the data.

In the prior art methods, the analysis results are usually made according to personal experiences, thus reducing reliability thereof. In addition, workers in the semiconductor manufacturers are often changed to make it difficult to find experienced engineers to deal with all of the manufacturing equipment. When the testing results are irregular, the engineers are short of experiences to exactly point out problems resulting in the irregular testing results. A lot of time must be spent for the engineers to find the problems. In addition, it is also possible for the engineers to do wrong analysis depending on their experiences. As a result, efficiency of the manufacturing processes is reduced. The production costs are increased, and the problems cannot be effectively resolved to improve the throughputs.

It is therefore very important to provide an analysis system and a method thereof for the semiconductor manufacturers to effectively find problems from irregular testing results.

SUMMARY OF INVENTION

It is an objective of the claimed invention to provide a complex multivariate analysis system to effectively find out problems of semiconductor processes.

According to the claimed invention, the complex multivariate analysis system has a storage module, a selecting module, an analyzing module, a correlation searching module and a reporting module. The storage module includes a first database and a second database. The first database records at least two data sets, each of the data sets including a plurality of items associated with a manufacturing process and data of the items. The second database records correlations of the items between the two data sets. The selecting module selects a first item from a first data set recorded in the first database. The analyzing module analyzes the first item selected by the selecting module and determines whether the data of the first item conform to specifications or not. The correlation searching module searches the second database when the analyzing module determines that the data of the first item do not conform to the specifications, and selects a second item correlated to the first item from a second data set recorded in the first database. Following that, the analyzing module analyzes the second item and determines whether the data of the second item conform to specifications or not. The reporting module outputs the analysis results made by the analyzing module.

In addition, the claimed invention provides a complex multivariate analyzing method. The method selects a first item from a plurality of items of a first data set associated with a manufacturing process. The first item is thereafter analyzed to determine whether the data of the first item conform to specifications or not. When the data of the first item do not conform to the specifications, a second item correlated to the first item is selected from a plurality of items of a second data set that is associated for another manufacturing process. The second item is then analyzed to determine whether the data of the second item conform to specifications or not. Following that, the analysis results of the first item and the second item are outputted.

It is an advantage of the present invention that the complex multivariate analysis system and the method thereof store the two data sets associated with two different processes in the first database, and store the correlations of the items between the two data sets in the second database. The item to be analyzed can be effectively selected from the two databases to find out problems of the semiconductor processes according to the present invention. Therefore, wrong analysis made by engineers is prevented, production costs are reduced and the problems of the semiconductor processes are effectively resolved to improve the throughputs.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
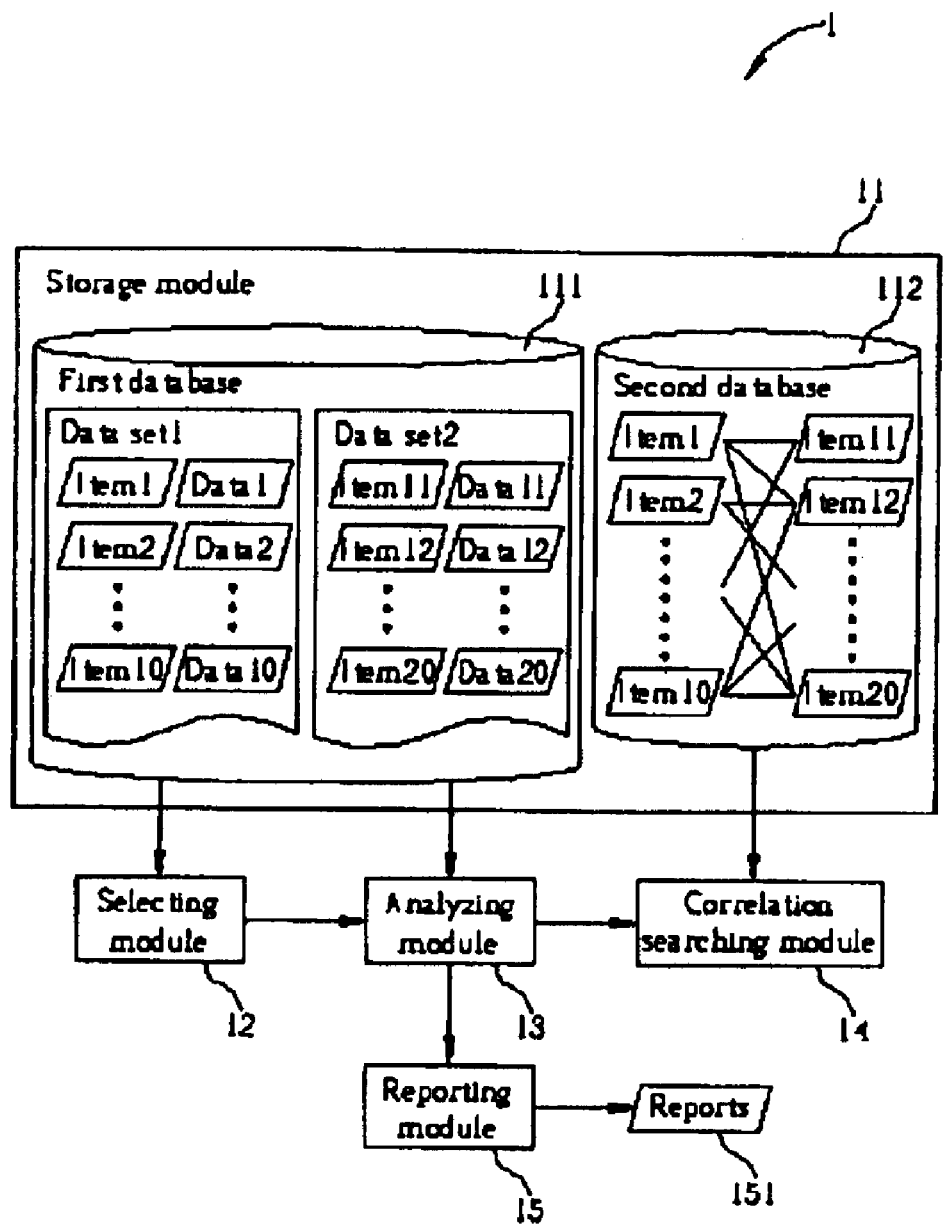
FIG. 1 is a schematic diagram of a complex multivariate analysis system according to the present invention.

Please refer to FIG. 1. A complex multivariate system 1 of a better embodiment of the present invention includes a storage module 11, a selecting module 12, an analyzing module 13, a correlation searching module 14 and a reporting module 15.

The storage module 11 includes a first database 111 and a second database 112. The first database 111 stores two data sets of data set1 and data set2. Each of the two data sets includes a plurality of items associated with a manufacturing process and data for each of the items. For example, the data set1 includes ten items of item1 to item10 and data of data1 to data10 corresponding to the ten items, respectively. The data set2 includes ten items of item11 to item20 and data of data11 to data20 corresponding to the ten items, respectively. The second database 112 stores correlations between the items of the data set1 and the items of the data set2. For example, as shown by the straight lines in FIG. 2, the item1 of the data set1 is correlated to the item11, item12 and item20 of the data set2.

In fabrication of semiconductor products, either of the data set1 and the data set2 refers to the data associated with semiconductor processes, such as data of photolithographic process, etching process, in-line quality control, defect test, sample test, wafer test, final test, etc. In this case, the items of item1 to item10 and item11 to item20 can be referred to equipment numbers, recipes, parameters, operation duration, test items, test results, defect numbers, defect images, defect distribution, etc. for the semiconductor processes. The data of data1 to data10 and data11 to data20 are referred to corresponding values of the items of equipment numbers, recipes, parameters, operation duration, test items, test results, defect numbers, defect images, defect distribution, etc.

The selecting module 12 selects an item from either the data set1 or the data set2 in the first database 111. For example, the selecting module 12 selects the item1 from the data set1. Alternatively, the selecting module 12 selects the item12 from the data set2.

The analyzing module 13 analyzes the selected item selected by the selecting module 12, so as to check whether the data of the selected item conform to specifications or not. For example, when the selecting module 12 selects the item1 from the data set1, the analyzing module 13 checks the data of the item1 (data1) conform to the corresponding specifications or not. When the item1 is defined as defect numbers, the analyzing module 13 analyzes whether the value of the defect numbers is in a tolerable extent. In this embodiment, the analyzing module 13 uses statistical methods or commonality methods to analyze the selected item.

When the analyzing module 13 determines the data of the selected item do not conform to the corresponding specifications, the correlation searching module 14 searches the second database 112, so as to select another correlated item to the selected item from another data set. Following that, the analyzing module 13 checks whether the data of the correlated item conform to corresponding specifications. For example, when the analyzing module 13 determines the value of the defect numbers is not in a tolerable extent, the correlation searching module 14 searches the second database 112 to select the correlated item, such as operation duration, to the defect numbers from the data set2. Following that, the analyzing module 13 checks the data of the correlated item (operation duration) and determines whether the value of the operation duration conforms to corresponding specifications.

The reporting module 15 generates a report 151 to output analysis results made by the analyzing module 13. For example, when the analyzing module 13 determines the data of the selected item conform to the corresponding specifications, the report 151 generated by the reporting module 15 indicates the selected item conform to the corresponding specifications. When the analyzing module 13 determines the data of the selected item do not conform to the corresponding specifications, the report 151 generated by the reporting module 15 indicates the selected item do not conform to the corresponding specifications. The report 151 is provided for the engineers to understand which portion of the semiconductor processes has problems and which portion of the semiconductor processes has no problems. Therefore, the engineers can exactly point out the problems of the processes according to the reports instead of according to his personal experiences. In addition, the reporting module 15 outputs the analysis results made by the analyzing module 13 through monitors according to other embodiments of the present invention.

Figure 2:
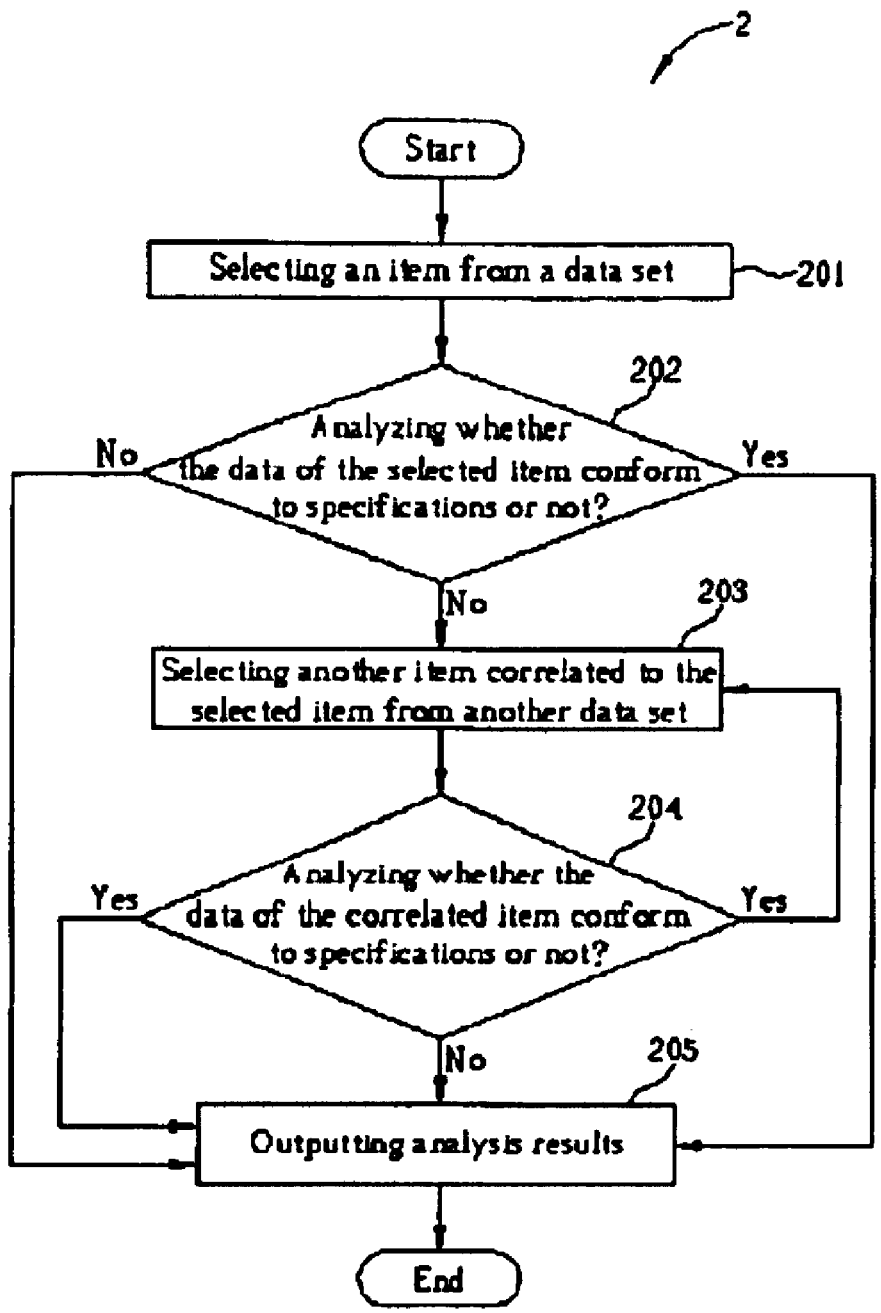
FIG. 2 is a flow chart of a complex multivariate analyzing method according to the present invention.

An example of a complex multivariate analyzing method 2 is shown in FIG. 2. The method includes a step 201 to select an item from a data set. In this embodiment, the data set includes a plurality of items associated with a test process and data of the items. The selected item is defined as defect numbers.

Following that, a step 202 is performed to analyze whether the data of the selected item conform to corresponding specifications. If the test process tolerates the value of the defect numbers to be 100, the step 202 may determine the defect numbers greater than 100 do not conform to the specifications, and determine the defect numbers less than 100 conform to the specifications.

When the step 202 determines the selected item do not conform to the corresponding specifications, a step 203 selects a correlated item to the selected item from another data set, which includes a plurality of items associated with manufacturing equipment and data of the items. The correlated item to the item of defect numbers is defined as operation duration of the equipment for example.

Following that, a step 204 is performed to analyze whether the data of the correlated item (operation duration) conform to corresponding specifications. If the equipment defines the value of the operation duration item to be 20 minutes, the step 204 may determine the value of the operation duration unequal to 20 minutes do not conform to the specifications, and determine the value of the operation duration equal to 20 minutes conform to the specifications.

When the step 204 determines the correlated item conform to the corresponding specifications, the method goes back to the step 203 to select another correlated item from the data set associated with the equipment followed by performing the step 204 again to analyze the last selected item. Therefore, the problems of the equipment can be found and the analysis errors made by personal experiences are completely prevented according to the present invention.

Finally, a step 205 is performed to output the results of the analyzing steps of 202 and 204. When either of the steps 202 and 204 determines the selected item conforms to the corresponding specifications, the results outputted by the step 205 indicate that the selected item is regular. When either of the steps 202 and 204 determines the selected item does not conform to the corresponding specifications, the results outputted by the step 205 indicate that the selected item is irregular.

When the selected item is irregular, those skilled in the art may resolve the problems of the processes according to the reporting results. In addition, the problems correlated to the selected item can also be found from another correlated process according to the results.

When the selected item conforms to the corresponding specifications, those skilled in the art do not need to vary the values of the selected item and all the correlated items to the selected item of another process according to the complex multivariate analyzing method 2.

In addition, the complex multivariate analyzing method 2 may further analyze another data set such as a data set3 (not shown) including a plurality of items associated with a third process and data thereof. The correlated items to the selected item of the data set2 can be found from the data set3 according to the method 2 to therefore point out the problems resulting in the irregular items.

The complex multivariate analysis system and the method thereof of the present invention store the two data sets associated with two different processes in the first database, and store the correlations of the items between the two data sets in the second database. The item to be analyzed can be effectively selected from the two databases to find out problems of the semiconductor processes according to the present invention. Therefore, wrong analysis made by engineers is prevented, production costs are reduced and the problems of the semiconductor processes are effectively resolved to improve the throughputs.

Those skilled in the art will readily observe that numerous modifications and alterations of the system and the method may be made while retaining the teachings of the invention. For example, the complex multivariate analysis system and the method thereof further store a third data set in the first database. Correlations of the items between the third data set and another data set are stored in the second database. Therefore, the items of the third data set can be analyzed to check a third process associated with the third data set conforms to corresponding specifications. In addition, the present invention is not limited to find out problems of manufacturing processes, but can be used to estimate yields of complete products. Therefore, engineers may determine whether it is worth continuing completion of the semi-finished products with defects. Accordingly, the above disclosure should be construed as limited only by the metes and bounds of the appended claims.

What is claimed is:

1. A complex multivariate analysis system comprising:
    a storage module, which comprising at least
        a first database for recording at least two data sets, each of the data sets comprising a plurality of items associated with a manufacturing process and data of the items; and
        a second database for recording correlations of the items between the two data sets;
    a selecting module for selecting a first item from a first data set recorded in the first database;
    an analyzing module for analyzing the first item selected by the selecting module and determining whether the data of the first item conform to specifications or not; and
    a correlation searching module for searching the second database when the analyzing module determines that the data of the first item do not conform to the specifications, and selecting a second item correlated to the first item from a second data set recorded in the first database; wherein the analyzing module further analyzes the second item and determines whether the data of the second item conform to specifications or not.

2. The complex multivariate analysis system of claim 1 further comprising a reporting module for outputting results made by the analyzing module.

3. The complex multivariate analysis system of claim 1 wherein each of the data sets recorded in the first database comprises the items and the data of the items associated with a semiconductor manufacturing process.

4. The complex multivariate analysis system of claim 3 wherein one of the items associated with the semiconductor manufacturing process comprises equipment parameters.

5. The complex multivariate analysis system of claim 3 wherein one of the items associated with the semiconductor manufacturing process comprises a test item.

6. The complex multivariate analysis system of claim 1 wherein the analyzing module uses statistical methods to analyze the items.

7. The complex multivariate analysis system of claim 1 wherein the analyzing module uses commonality methods to analyze the items.

8. A complex multivariate analyzing method comprising:
    selecting a first item from a plurality of items of a first data set associated with a manufacturing process, the first data set being recorded in a first database;
    analyzing the first item and determining whether the data of the first item conform to specifications or not;
    when the data of the first item do not conform to the specifications, selecting a second item correlated to the first item from a plurality of items of a second data set associated with another manufacturing process, the second data set being recorded in the first database and the correlations of the items between the first data set and the second data set being recorded in a second database; and
    analyzing the second item and determining whether the data of the second item conform to specifications or not.

9. The complex multivariate analyzing method of claim 8 further comprising outputting analysis results of the first item and the second item.

10. The complex multivariate analyzing method of claim 8 wherein the items and the data of the items in each of the data sets are associated with a semiconductor manufacturing process.

11. The complex multivariate analyzing method of claim 10 wherein one of the items associated with the semiconductor manufacturing process comprises equipment parameters.

12. The complex multivariate analyzing method of claim 10 wherein one of the items associated with the semiconductor manufacturing process comprises a test item.

13. The complex multivariate analyzing method of claim 8 wherein the first item is analyzed using statistical methods.

14. The complex multivariate analyzing method of claim 8 wherein the first item is analyzed using commonality methods.

15. The complex multivariate analyzing method of claim 8 wherein the second item is analyzed using statistical methods.

16. The complex multivariate analyzing method of claim 8 wherein the second item is analyzed using commonality methods.

* * * * *